(12) United States Patent
Rieder et al.

(10) Patent No.: US 8,826,744 B2
(45) Date of Patent: Sep. 9, 2014

(54) MEASURING TRANSDUCER OF VIBRATION-TYPE AS WELL AS METHOD FOR ITS MANUFACTURE

(75) Inventors: Alfred Rieder, Landshut (DE); Wolfgang Drahm, Erding (DE); Michael Wiesmann, Freising (DE); Christof Huber, Bern (CH); Martin Anklin, Dornach (CH)

(73) Assignee: Endress + Hauser Flowtec AG, Reinach (CH)

( * ) Notice: Subject to any disclaimer, the term of this patent is extended or adjusted under 35 U.S.C. 154(b) by 323 days.

(21) Appl. No.: 13/433,880

(22) Filed: Mar. 29, 2012

(65) Prior Publication Data
US 2012/0255369 A1 Oct. 11, 2012

Related U.S. Application Data

(60) Provisional application No. 61/472,767, filed on Apr. 7, 2011.

(30) Foreign Application Priority Data

Apr. 7, 2011 (DE) .......................... 10 2011 006 971

(51) Int. Cl.
*G01F 1/84* (2006.01)
(52) U.S. Cl.
USPC .................................. 73/861.355; 73/861.357
(58) Field of Classification Search
USPC ................ 73/627, 861.355, 861.357; 29/428, 29/407.01
See application file for complete search history.

(56) References Cited

U.S. PATENT DOCUMENTS

| 5,174,732 | A | * | 12/1992 | Hoya | 417/394 |
| 5,336,052 | A | * | 8/1994 | Zollner et al. | 417/20 |
| 5,370,002 | A | | 12/1994 | Normen | |
| 7,472,607 | B2 | * | 1/2009 | Bitto et al. | 73/861.357 |
| 7,490,521 | B2 | * | 2/2009 | Bitto et al. | 73/861.357 |
| 2012/0167697 | A1 | * | 7/2012 | Rieder et al. | 73/861.357 |
| 2013/0291652 | A1 | * | 11/2013 | Rieder et al. | 73/861.357 |

FOREIGN PATENT DOCUMENTS

| DE | 10237209 A1 | 3/2004 |
| DE | 10351311 B3 | 6/2005 |
| DE | 102006062219 A1 | 6/2008 |

(Continued)

OTHER PUBLICATIONS

International Search Report.

(Continued)

*Primary Examiner* — J M Saint Surin
(74) *Attorney, Agent, or Firm* — Bacon & Thomas, PLLC

(57) ABSTRACT

A measuring transducer comprises a housing, and a tube arrangement formed by means of at least two tubes extending within the housing. At least one tube is embodied as a measuring tube serving for conveying flowing medium and another tube is mechanically connected with the tube by means of a coupling element to form an inlet-side coupling zone and by means of a coupling element. The coupling element is arranged equally far removed from the housing end. One coupling element has, about an imaginary longitudinal axis of the tube arrangement imaginarily connecting a center of mass of the coupling element and a center of mass of the other coupling element, with an angle of intersection equal to that with the other coupling element, a bending stiffness, which deviates from a bending stiffness of the other coupling element about said imaginary longitudinal axis of the tube arrangement.

25 Claims, 7 Drawing Sheets

(56) References Cited

FOREIGN PATENT DOCUMENTS

| | | |
|---|---|---|
| EP | 1248084 A1 | 10/2002 |
| JP | 2009-180699 | 8/2009 |
| WO | WO 2004/017027 A1 | 2/2004 |

OTHER PUBLICATIONS

English translation of IPR, WIPO, Geneva, Oct. 17, 2013.
German Search Report.

\* cited by examiner

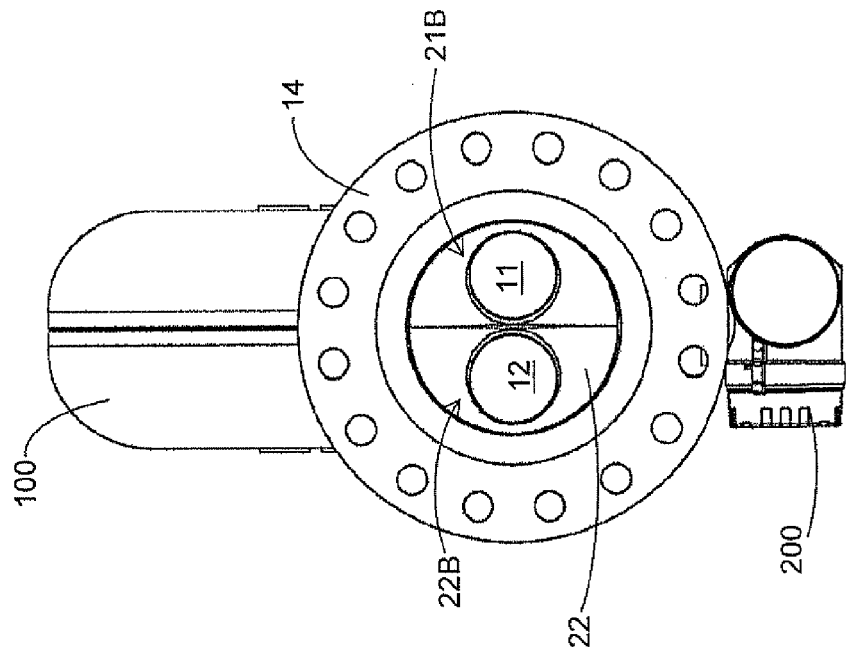
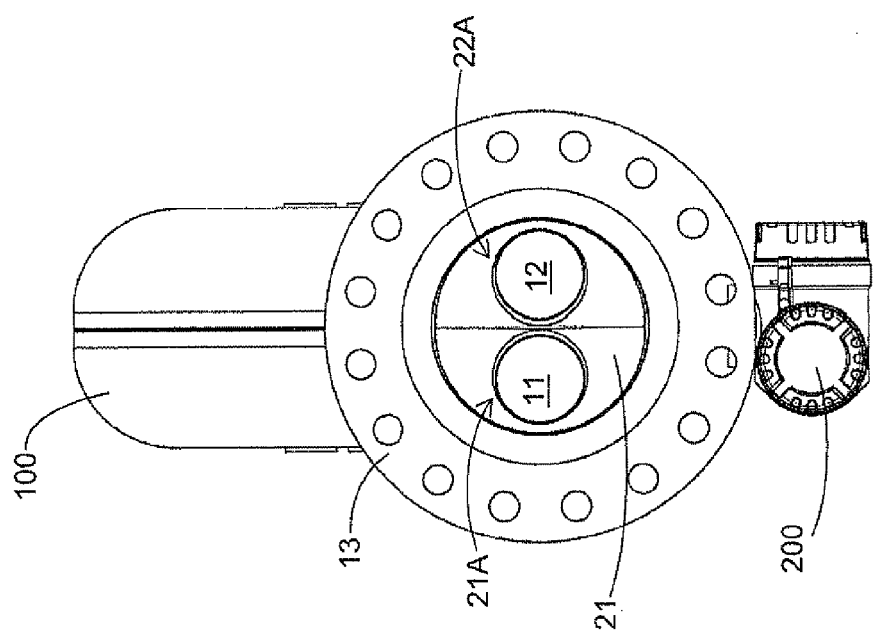

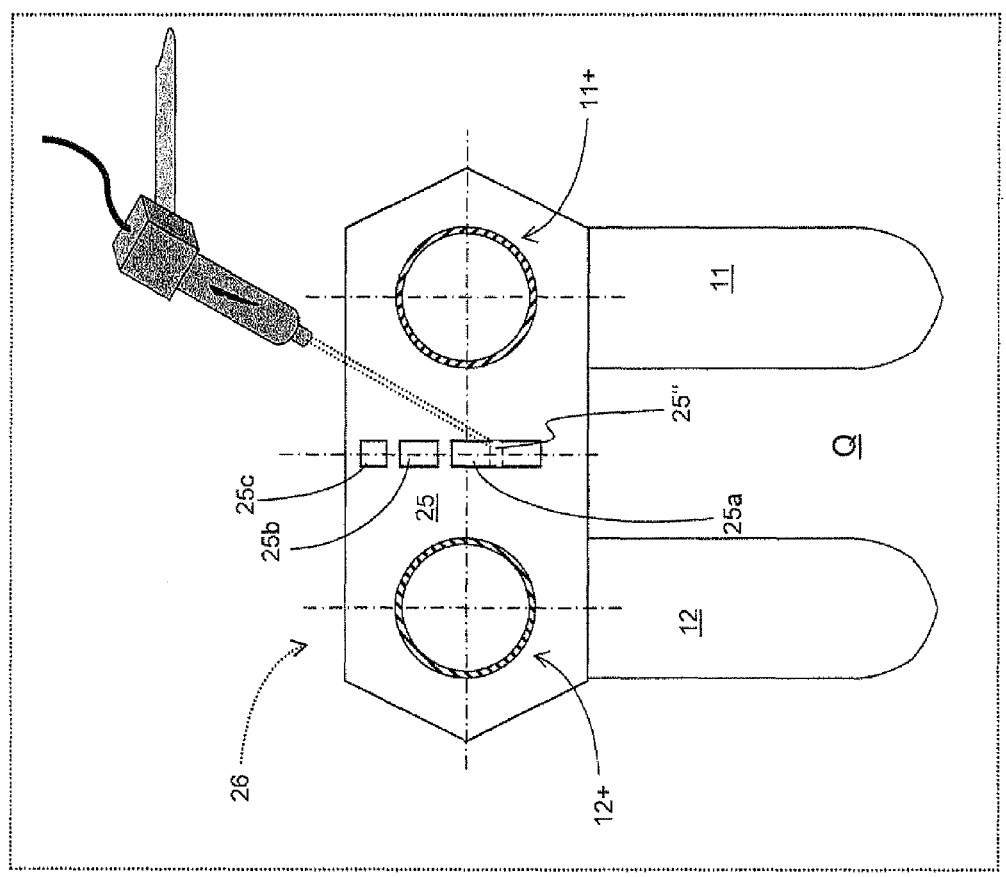

MEASURING TRANSDUCER OF VIBRATION-TYPE AS WELL AS METHOD FOR ITS MANUFACTURE

CROSS-REFERENCE TO RELATED APPLICATION

This application is a nonprovisional which claims the benefit of U.S. Provisional Application No. 61/472,767, which was filed on Apr. 7, 2011.

TECHNICAL FIELD

The invention relates to a measuring transducer of the vibration-type as well as to a method for manufacture of such a measuring transducer of the vibration-type. Moreover, the invention relates also to a measuring system formed by means of such a measuring transducer.

BACKGROUND DISCUSSION

In industrial measurements technology, especially also in connection with the control and monitoring of automated manufacturing processes, for ascertaining characteristic measured variables of media flowing in a process line, for example, a pipeline, for example, of media such as liquids and/or gases, often such measuring systems are used, which, by means of a measuring transducer of vibration-type and a transmitter electronics connected thereto, most often a transmitter electronics accommodated in a separate electronics housing, induce in the flowing medium reaction forces, for example, Coriolis forces, and produce, repetitively derived from these, measured values, for example, mass flow rate, density, viscosity or some other process parameter correspondingly representing the at least one measured variable. Such measuring systems—often formed by means of an in-line measuring device in compact construction with integrated measuring transducer, such as, for instance, a Coriolis, mass flow meter, —are long known and have proven themselves in industrial use. Examples of such measuring systems with a measuring transducer of vibration-type or also individual components thereof, are described e.g. in EP-A 421 812, EP-A 462 711, EP-A 763 720, EP-A 1 248 084, U.S. Pat. No. 4,680,974, U.S. Pat. No. 4,738,144, U.S. Pat. No. 4,768,384, U.S. Pat. No. 4,801,897, U.S. Pat. No. 4,823,614, U.S. Pat. No. 4,879,911, U.S. Pat. No. 5,009,109, U.S. Pat. No. 5,050,439, U.S. Pat. No. 5,359,881, U.S. Pat. No. 5,602,345, U.S. Pat. No. 5,610,342, U.S. Pat. No. 5,734,112, U.S. Pat. No. 5,796,011, U.S. Pat. No. 5,926,096, U.S. Pat. No. 5,969,264, U.S. Pat. No. 7,127,952, U.S. Pat. No. 6,092,429, U.S. Pat. No. 6,311,136, U.S. Pat. No. 6,883,387, U.S. Pat. No. 7,325,461, U.S. Pat. No. 7,392,709, U.S. Pat. No. 7,421,350, U.S. Pat. No. 7,610,795, U.S. Pat. No. 2010/0050783, US-A 2010/0251830, US-A 2010/0242623, WO-A 96/08697, WO-A 98/40702, WO-A 2004/099735, WO-A 2005/050145, WO-A 2007/040468, WO-A 2008/059015, WO-A 2010/059157 or the not pre-published German patent application DE 102009046043.8 of Endress+Hauser.

Therein shown measuring transducers comprise at least two, essentially straight, or curved, e.g. U-, or V-shaped, equally constructed, measuring tubes accommodated in a measuring transducer housing for conveying the medium, in given cases, a medium that is also inhomogeneous, extremely hot and even very viscous. The at least two measuring tubes can, as, for example, shown in the mentioned U.S. Pat. No. 5,734,112, U.S. Pat. No. 5,796,011 or US-A 2010/0242623, be integrated into the process line via a flow divider extending on the inlet side between the measuring tubes and an inlet-side connecting flange as well as via a flow divider extending on the outlet side between the measuring tubes and an outlet-side connecting flange, in order to form a tube arrangement with flow paths connected in parallel with one another. The measuring tubes can, however, also, as shown, for example, in the mentioned EP-A 421 812, EP-A 462 711, EP-A 763 720, be integrated into the process line via in- and outlet tube pieces, in order to form a tube arrangement with a single traversing flow path. In measurement operation, the measuring tubes, which are flowed through—in parallel, or serially—are then caused to vibrate for the purpose of generating oscillation forms influenced by the medium flowing through.

Selected as excited oscillation form—the so-called wanted mode—is, in the case of measuring transducers with curved measuring tubes, usually that eigenoscillation form (eigenmode), in the case of which each of the measuring tubes moves as a cantilever in a pendulum-like manner at least partially at a natural resonance frequency (eigenfrequency) about an imaginary longitudinal axis of the measuring transducer, whereby Coriolis forces are induced in the through flowing medium as a function of the mass flow. These, in turn, lead to the fact that superimposed on the excited oscillations of the wanted mode, in the case of curved measuring tubes, thus the pendulum-like, cantilever oscillations, are thereto equal frequency, bending oscillations according to at least one likewise natural, second oscillation form of, in comparison to the wanted mode, higher (modal) order, the so-called Coriolis mode. In the case of measuring transducers with curved measuring tubes, these cantilever oscillations in the Coriolis mode forced by Coriolis forces correspond usually to that eigenoscillation form, in the case of which the measuring tube also executes rotary oscillations about an imaginary vertical axis directed perpendicularly to the longitudinal axis. In the case of measuring transducers with straight measuring tubes, in contrast, for the purpose of producing mass flow dependent, Coriolis forces, often a wanted mode is selected, in the case of which each of the measuring tubes execute, at least partially, bending oscillations essentially in a single imaginary plane of oscillation, so that the oscillations in the Coriolis mode, accordingly, are embodied as bending oscillations of equal oscillation frequency coplanar with the wanted mode oscillations.

For active exciting of oscillations of the at least two measuring tubes, measuring transducers of the vibration-type have, additionally, an exciter mechanism driven, during operation, by an electrical driver signal, e.g. a controlled electrical current, generated and correspondingly conditioned by the mentioned transmitter electronics, and, respectively, a therein correspondingly provided, special driver circuit. The exciter mechanism excites the measuring tube by means of at least one electromechanical, especially electrodynamic, oscillation exciter flowed through during operation by an electrical current and acting practically directly, especially differentially, on the at least two measuring tubes, such that they execute bending oscillations, especially opposite equal, bending oscillations, in the wanted mode. Furthermore, such measuring transducers include a sensor arrangement with oscillation sensors, especially electrodynamic, oscillation sensors, for the at least pointwise registering of inlet-side and outlet-side oscillations of at least one of the measuring tubes, especially opposite equal bending oscillations of the measuring tubes in the Coriolis mode, and for producing electrical sensor signals serving as vibration signals of the measuring transducer and influenced by the process parameter to be registered, such as, for instance, the mass flow or the density. As described, for example, in U.S. Pat. No.

7,325,461, in the case of measuring transducers of the type being discussed, in given cases, also the oscillation exciter can, at least at times, be used as oscillation sensor and/or an oscillation sensor at least at times as oscillation exciter. The exciter mechanism of measuring transducers of the type being discussed includes usually at least one electrodynamic oscillation exciter and/or an oscillation exciter acting differentially on the measuring tubes, while the sensor arrangement comprises an inlet-side, most often likewise electrodynamic, oscillation sensor as well as at least one thereto essentially equally constructed, outlet-side oscillation sensor. Such electrodynamic and/or differential oscillation exciters of usually marketed measuring transducers of vibration-type are formed by means of a magnet coil, through which electrical current flows, at least at times, and which is affixed on one of the measuring tubes, as well as by means of a permanent magnet interacting with the at least one magnet coil, especially plunging into such, serving as a rather elongated armature, especially with rod-shaped form, correspondingly affixed on the other, opposite equally moving, measuring tube. The permanent magnet and the magnet coil serving as exciter coil are, in such case, usually so oriented that they extend essentially coaxially relative to one another. Additionally, in the case of conventional measuring transducers, the exciter mechanism is usually embodied in such a manner and placed in the measuring transducer such that it acts essentially centrally on the measuring tubes. In such case, the oscillation exciter and, insofar, the exciter mechanism, is, as shown, for example, also in the case of that in the proposed measuring transducers, affixed outwardly on the respective measuring tube at least pointwise along an imaginary central peripheral line thereof. Alternatively to an exciter mechanism formed by means of oscillation exciters acting rather centrally and directly on the respective measuring tube, the exciter mechanism can, as, among other things, provided in U.S. Pat. No. 6,092,429 or U.S. Pat. No. 4,823,614, for example, also be formed by means of two oscillation exciters affixed, in each case, not in the center of the respective measuring tube, but, instead rather on the in-, and, respectively, outlet sides.

In the case of usually marketed measuring transducers of vibration-type, the oscillation sensors of the sensor arrangement are, at least insofar as they work according to the same principle of action, embodied with essentially the same construction as the at least one oscillation exciter. Accordingly, also the oscillation sensors of such a sensor arrangement are most often, in each case, formed by means of at least one magnet coil, which is affixed on one of the measuring tubes and, at least at times, passed through by a variable magnetic field and, associated therewith, supplied, at least at times, with an induced measurement voltage, as well as a permanently magnetic armature, which delivers the magnetic field, with the armature being affixed on another of the measuring tubes and interacting with the at least one coil. Each of the aforementioned coils is additionally connected by means of at least one pair of electrical connecting lines with the mentioned transmitter electronics of the in-line measuring device. These electrical connecting lines are led most often on as short as possible paths from the coils to the measuring transducer housing. Due to the superimposing of wanted—and Coriolis modes, the oscillations of the vibrating measuring tubes registered by means of the sensor arrangement on the inlet side and on the outlet side have a measurable phase difference also dependent on the mass flow. Usually, the measuring tubes of such measuring transducers applied, e.g. in Coriolis, mass flow meters are excited during operation to an instantaneous natural resonance frequency of the oscillation form selected for the wanted mode, e.g. at constant controlled oscillation amplitude. Since this resonance frequency depends, especially, also on the instantaneous density of the medium, market-usual Coriolis, mass flow meters can measure, besides mass flow, supplementally also the density of flowing media. Additionally, it is also possible, as, for example, shown in U.S. Pat. No. 6,651,513 or U.S. Pat. No. 7,080,564, by means of measuring transducers of vibration-type, directly to measure viscosity of the through flowing medium, for example, based on the exciter energy, or excitation power, required for maintaining the oscillations and/or based on the attenuation, or damping, of oscillations of the at least one measuring tube, especially oscillations in the aforementioned wanted mode, resulting from dissipation of oscillatory energy. Moreover, also other measured variables, such as, for instance, according to U.S. Pat. No. 6,513,393, the Reynolds number, derived from the aforementioned primary measured values, mass flow rate, density and viscosity, can be ascertained.

In the case of measuring transducers of the type being discussed, it is especially important to trim the oscillation characteristics of individual measuring transducer components, not last also the at least one measuring tube, consequently the said oscillation characteristics characterizing, or influencing, parameters, such as, for instance, tube shapes, and, respectively, cross sections, tube wall thicknesses and, associated therewith, mass distributions, bending stiffnesses, eigenfrequencies etc., of each individual measuring transducer example as exactly as possible at a target dimension therefor, in each case, predetermined for defined reference conditions, and, respectively, to hold the scattering of said parameters within a population of manufactured measuring transducer of such type in an as narrow as possible tolerance range predetermined therefor. Equally important in the case of measuring transducers of the type being discussed is to prevent possible imbalances of the respective tube arrangement, brought about, for instance, by non-uniform, consequently non-symmetric, mass and/or stiffness distributions within the tube arrangement.

In such case, it is, among other things, also of special interest, at an, as much as possible, "late" production phase, to set the eigenfrequencies of the respective tube arrangement of the measuring transducer to the desired target(s), here thus one or more selected target eigenfrequencies, respectively, correspondingly to compensate possible imbalances, in order to be able to prevent, reliably, possible newer detunings of the tube arrangement in a following production phase of the measuring transducer.

In the initially mentioned U.S. Pat. No. 5,610,342, for example, a method for the dynamic tuning of a tube serving as measuring tube of a measuring transducer of vibration-type to a target stiffness is shown, in the case of which method the tube is pressed in on its two tube ends in bores of a first, and, respectively, second end piece of a support tube by targeted plastic deformation of the tube walls in the region of the tube ends and the entire tube arrangement is simultaneously adjusted to a target eigenfrequency. Additionally, in the initially mentioned U.S. Pat. No. 7,610,795, a method is described for tuning a tube serving as measuring tube of a measuring transducer of vibration-type to a target eigenfrequency, consequently to a target bending stiffness co-determined by the tube geometry and cross section, by means of a fluid introduced therein and supplied with an (over-) pressure introducing plastic deformation of at least of a part of its tube wall.

A disadvantage of the methods known from the state of the art is, among other things, that they are very complicated. Moreover, another disadvantage of the aforementioned methods is that, inherently therewith, ultimately a certain change of the geometry of the tubes, namely a deviation from the ideal circular shape of the cross section, or an increased deviation from perfect homogeneity of the cross section in the longitudinal direction, consequently a deviation of the contour of the lumen of the tube from the ideal form, is introduced.

SUMMARY OF THE INVENTION

An object of the invention is, consequently, to provide a measuring transducer of vibration-type, in the case of which imbalances of the aforementioned type can largely be prevented from the start, and, respectively, in given cases, can also be easily compensated out at a later production phase. Furthermore, an object of the invention is also to provide a method, which enables a precise and, equally as well, simple tuning of a tube arrangement formed by means of at least two tubes, and ultimately serving as inner part of measuring transducers of the initially named type, to a target eigenfrequency, even in a phase of the manufacturing process for such a tube arrangement, consequently also of measuring transducers of vibration-type, in which the particular tube arrangement has already been produced, in given cases, also already equipped with oscillation exciter, and/or oscillation sensor, components. All this should be accomplished as much as possible while avoiding subsequent plastic deformation even of only one of the tubes of the tube arrangement.

For achieving the object, the invention resides in a measuring transducer of vibration-type serving for producing vibration signals corresponding to parameters of a flowing medium, for example, a mass flow rate, a density and/or a viscosity, which measuring transducer comprises a measuring transducer housing having a first housing end and a second housing end and a tube arrangement formed by means of at least two tubes extending within the measuring transducer housing from its first housing end to its second housing end, for example, equally constructed tubes and/or tubes extending parallel to one another. Of the tubes, at least a first tube, for example, a first tube vibrating during operation, is embodied as a measuring tube serving for conveying flowing medium, and a second tube, for example, a second tube vibrating during operation, is mechanically connected with the first tube by means of a first coupling element, for example, a plate-shaped, first coupling element, to form an inlet-side, first coupling zone and by means of a second coupling element, for example, a plate-shaped, second coupling element, to form an outlet-side, second coupling zone. The first coupling element is arranged equally far removed from the first housing end of the measuring transducer housing, as the second coupling element is from the second housing end of the measuring transducer housing. Moreover, the first coupling element has, about an imaginary longitudinal axis of the tube arrangement imaginarily connecting a center of mass of the first coupling element and a center of mass of the second coupling element, for example, also imaginarily intersecting the first coupling element with an angle of intersection equal to that with the second coupling element, a bending stiffness, which deviates from a bending stiffness of the second coupling element about said imaginary longitudinal axis of the tube arrangement, especially a bending stiffness which deviates by more than 0.1% of said bending stiffness of the second coupling element.

Furthermore, the invention resides in a measuring system formed by means of such a measuring transducer for a medium flowing in a pipeline, for example, an aqueous, liquid medium, a slurry, a paste or other flowable material, which measuring system, for example, a measuring system embodied as a compact-measuring device and/or as a Coriolis, mass flow measuring device, further comprises a transmitter electronics electrically coupled with the measuring transducer (through which medium flows during operation) for operating the measuring transducer and for evaluating vibration signals delivered from the measuring transducer, Moreover, the invention resides also in a method for manufacturing a measuring transducer of vibration-type, which measuring transducer has a measuring transducer housing with a first housing end and a second housing end, as well as a tube arrangement formed by means of at least two tubes extending within the measuring transducer housing from its first housing end to its second housing end, of which at least two tubes at least a first tube, for example, a first tube vibrating during operation, is embodied as a measuring tube serving for conveying flowing medium, and a second tube, for example, a second tube vibrating during operation, is mechanically connected with the first tube by means of a first coupling element, for example, a plate-shaped, first coupling element, to form an inlet-side, first coupling zone and by means of a second coupling element, for example, plate-shaped, second coupling element, to form an outlet-side, second coupling zone. The method of the invention comprises, especially, a step of connecting the first coupling element with the first tube and the second tube as well as the second coupling element with the first tube and the second tube. Additionally, the method of the invention also comprises, in given cases, multiply applied, a step of removing volume from at least one of the coupling elements—, for example, also from a region of said coupling element extending between the first and second tube—after said coupling element is connected with the first and second tubes. This is done, for example, also in such a manner that the first coupling element has a bending stiffness (about an imaginary, longitudinal axis of the tube arrangement imaginarily intersecting the first coupling element with the same angle as it intersects the second coupling element), which deviates from a bending stiffness of the second coupling element around said imaginary longitudinal axis of the tube arrangement by more than 0.1% of said bending stiffness of the second coupling element.

According to a first embodiment of the measuring transducer of the invention, it is, furthermore, provided that the imaginary longitudinal axis of the tube arrangement imaginarily intersects the first coupling element at a same smallest angle of intersection as it does the second coupling element.

According to a second embodiment of the measuring transducer of the invention, it is, furthermore, provided that the first tube extends parallel to the second tube.

According to a third embodiment of the measuring transducer of the invention, it is, furthermore, provided that the first tube and the second tube are of equal construction as regards shape and material.

According to a fourth embodiment of the measuring transducer of the invention, it is, furthermore, provided that each of the tubes is curved, especially U-shaped or V-shaped. Alternatively, thereto, however, also each of the tubes can be straight.

According to a fifth embodiment of the measuring transducer of the invention, it is, furthermore, provided that a first imaginary connecting axis, which imaginarily connects a first tube end of the first tube and a second tube end of the first tube, is both parallel to a second imaginary connecting axis, which imaginarily connects a first tube end of the second tube and a second tube end of the second tube, as well as also perpendicular to an imaginary central plane of the tube arrangement. Developing this embodiment of the invention further, it is, additionally, provided that the imaginary longitudinal axis of the tube arrangement imaginarily connecting the center of mass of the first coupling element and the center of mass of the second coupling element is not perpendicular to said imaginary central plane of the tube arrangement, especially it imaginarily intersects said imaginary central plane of the tube arrangement at an angle, which amounts to less than 89°, and, respectively, that the imaginary longitudinal axis of the tube arrangement imaginarily connecting the center of mass of the first coupling element and the center of mass of the second coupling element imaginarily intersects said imaginary central plane of the tube arrangement at an angle, which is smaller than 90°, especially amounts to less than 89°.

According to a sixth embodiment of the measuring transducer of the invention, it is, furthermore, provided that also the second tube is embodied as a measuring tube serving for conveying flowing medium.

According to a first further development of the measuring transducer of the invention, it additionally comprises, mechanically coupled with the tube arrangement, especially mounted on the first and second tubes, an electromechanical exciter mechanism for effecting vibrations, especially opposite equal bending oscillations, of the at least two tubes, for example, also in such a manner that the first tube executes, at least partially, bending oscillations about a first imaginary bending oscillation axis of the tube arrangement and the second tube at least partially bending oscillations about a second imaginary bending oscillation axis of the tube arrangement parallel to the first imaginary bending oscillation axis.

According to a second further development of the measuring transducer of the invention, it additionally comprises a sensor arrangement for registering vibrations, especially bending oscillations, at least one of the tubes and for producing at least one vibration signal representing said vibrations.

According to a third further development of the measuring transducer of the invention, it additionally comprises an inlet-side, first flow divider with at least two flow openings spaced from one another, as well as an outlet-side, second flow divider with at least two flow openings spaced from one another. Furthermore, in such case, in order to form a tube arrangement with at least two flow paths connected for parallel flow, the at least two tubes are connected to the flow dividers, for example, also equally-constructed, flow dividers, namely in such a manner that the first tube opens with an inlet-side, first tube end into a first flow opening of the first flow divider and with an outlet-side, second tube end into a first flow opening of the second flow divider and the second tube opens with an inlet-side, first tube end into a second flow opening of the first flow divider and with an outlet-side, second tube end into a second flow opening of the second flow divider. In such case, for example, also the first housing end of the measuring transducer housing can be formed by means of a first flow divider and the second housing end of the measuring transducer housing by means of a second flow divider.

According to a first embodiment of the method of the invention—in consideration of the fact that the tube arrangement has, after the coupling elements are connected with the first and second tubes, an interim eigenfrequency co-determined by the coupling elements, particularly also by the respective bending stiffnesses of each of the coupling elements about an imaginary, longitudinal axis of the tube arrangement imaginarily intersecting the first coupling element with the same angle of intersection as it does the second coupling element—, it is further provided that the removing of volume from at least one of the coupling elements is performed until, and/or repeated until, the interim eigenfrequency is tuned to a target eigenfrequency predetermined for the tube arrangement and lower than the interim eigenfrequency.

According to a second embodiment of the method of the invention, laser-light is used for removing volume from the at least one coupling element, for example, laser light applied by means of a gas laser, by means of a solid laser or also by means of a fiber laser.

According to a third embodiment of the method of the invention, it is, furthermore, provided that the removing of volume from the at least one coupling element comprises a step of introducing at least one slit, or slot, into said coupling element.

According to a fourth embodiment of the method of the invention, it is, furthermore, provided that the removing of volume from the at least one coupling element comprises a step of grinding at least one notch into said coupling element.

According to a first further development of the method of the invention, such additionally comprises a step of detecting whether the tube arrangement is trimmed to the target-eigenfrequency, especially based on at least one mechanical eigenfrequency of the tube arrangement measured in the case of vibrating tube.

According to a second further development of the method of the invention, such additionally comprises a step of ascertaining to what extent the interim eigenfrequency of the tube arrangement deviates from the target eigenfrequency, especially based on at least one mechanical eigenfrequency of the tube arrangement measured in the case of vibrating tube.

According to a third further development of the method of the invention, such additionally comprises a step of causing at least one of the tubes to vibrate for ascertaining the interim eigenfrequency.

A basic idea of the invention is to trim one or more eigenfrequencies of a tube arrangement, especially a tube arrangement serving as a component of a measuring transducer of the vibration-type, very simply, equally as well, very effectively, to a corresponding, namely desired, target therefor, consequently to a particular target eigenfrequency, by reducing by a certain amount a beginning volume of at least one coupling element connecting tubes of the tube arrangement, after the coupling element has already been attached to the respective tubes, so that, as a result of the associated weakening of the coupling element, a (total-)bending stiffness of the tube arrangement co-determined by the coupling element, or a corresponding spring constant, consequently the eigenfrequencies of the tube arrangement co-determined thereby, are reduced by a corresponding magnitude. In this way, eigenfrequencies of the so formed tube arrangement can also be brought, at a comparatively "late" phase of the production, very precisely, to the desired target, in which then a renewed undefined detuning of the tube arrangement, consequently of the measuring transducer, no longer needs to be a concern. A further advantage of the method is therewith to be seen in the fact that it is basically also applicable to conventional measuring transducers of vibration-type, and, consequently, can also find application in a conventional tube arrangement.

The invention as well as other advantageous embodiments and utilities thereof will now be explained in greater detail based on examples of embodiments shown in the figures of the drawing. Equal parts are provided in all of the figures with equal reference characters; when perspicuity requires or when it otherwise appears sensible, already mentioned reference characters are omitted in subsequent figures. Other advantageous embodiments or further developments, especially also combinations of first only individually explained aspects the invention, will become evident additionally from the figures of the drawing, as well as also from the dependent claims per se.

BRIEF DESCRIPTION OF THE DRAWINGS

FIGS. 1, 2a and 2b show in side and end views, a measuring system embodied as a compact measuring device for measuring media flowing in pipelines;

FIG. 7 a section of a second variant of a tube arrangement, especially a tube arrangement also suited for a measuring transducer according to FIGS. 4, 5, with a coupling element affixed to two tubes.

BRIEF DESCRIPTION IN CONJUNCTION WITH THE DRAWINGS

Figure 1:
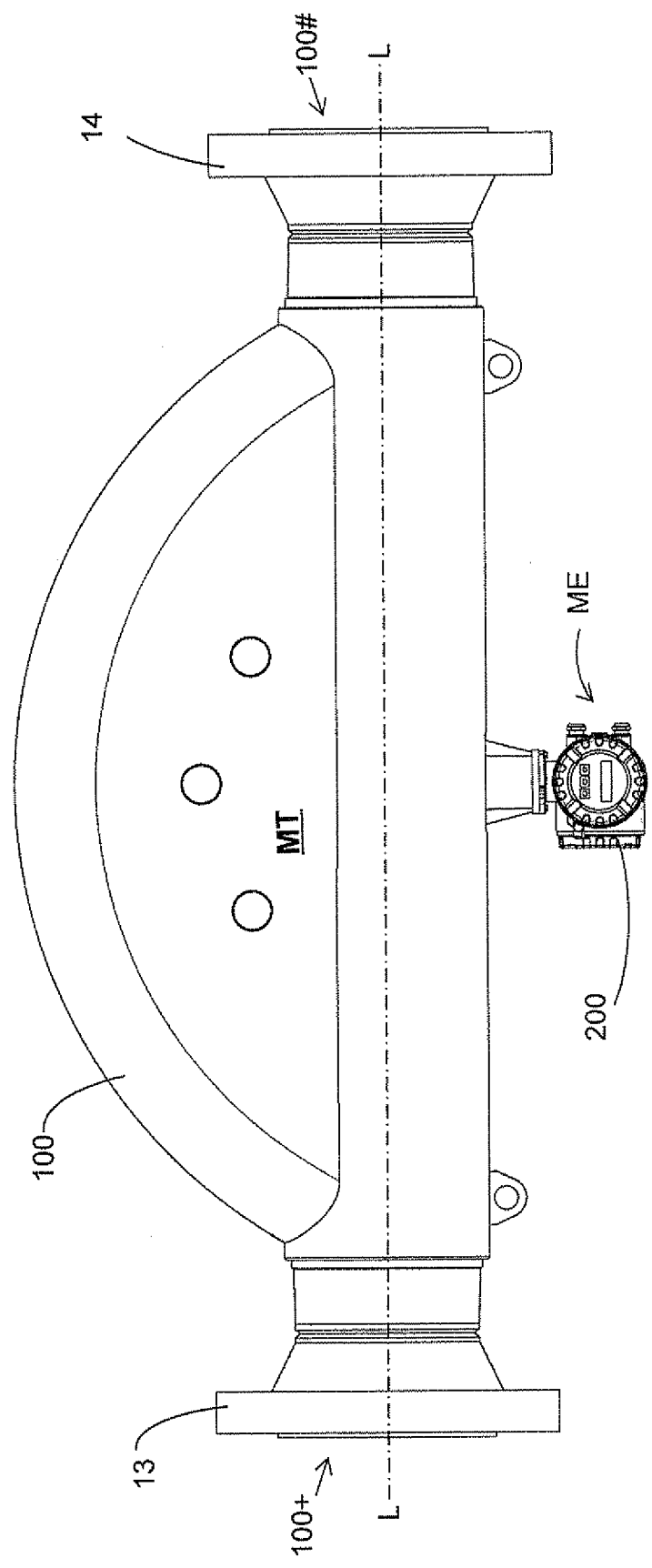

FIGS. 1, 2a and 2b show schematically an example of an embodiment of a measuring system embodied, for example, as a Coriolis mass flow measuring device, density measuring device, viscosity measuring device or the like, insertable in a process line (not shown), for instance, a pipeline of an industrial plant, for measuring flowable, especially fluid, media, especially, measuring and/or monitoring at least one physical parameter of a medium, such as, for instance, mass flow rate, density, viscosity or the like. The measuring system—implemented here as an in-line measuring device in compact construction—comprises therefor a measuring transducer MT connected to the process line via an inlet end 100+ as well as an outlet end 100# and serving for registering the at least one parameter and its conversion into measurement signals representative thereof. During operation, the medium to be measured, such as, for instance, a low viscosity liquid and/or a high viscosity paste, flows through the measuring transducer, which is connected in the measuring system with a transmitter electronics ME electrically coupled with the measuring transducer and serving for activating the measuring transducer and for evaluating measuring signals delivered by the measuring transducer.

Figure 3:
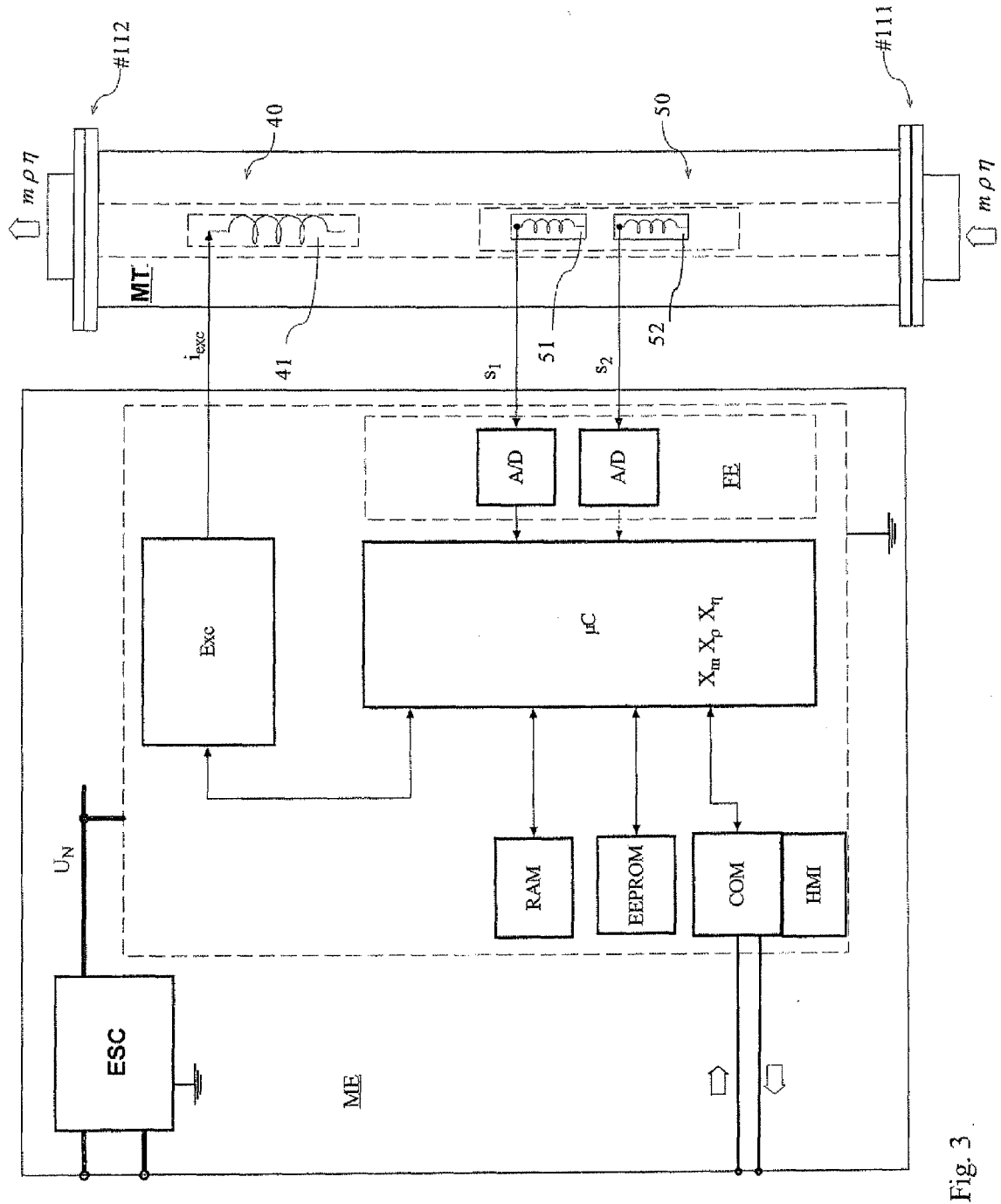
FIG. 3 is a schematic block diagram of a transmitter electronics with measuring transducer of vibration-type connected thereto, especially a transmitter electronics suitable for a measuring system according to FIGS. 1 and 2.

The transmitter electronics, especially a transmitter electronics supplied during operation with electrical energy from the exterior via connecting cable and/or by means of an internal energy storer, includes, as shown in FIG. 3 schematically and in the manner of a block diagram, a driver circuit Exc serving for activating the measuring transducer, for example, a measuring transducer of vibration-type, as well as a measuring and evaluating circuit μC for processing measurement signals of the measuring transducer MT. The measuring and evaluating circuit is formed, for example, by means of a microcomputer and/or communicates during operation with the driver circuit Exc. During operation, the measuring and evaluating circuit delivers measured values representing the at least one measured variable, such as e.g. the instantaneous, or totaled, mass flow. The driver circuit Exc and the evaluating circuit μC as well as other electronic components of the transmitter electronics serving for the operation of the measuring system, such as, for instance, internal energy supply circuits ESC for providing internal supply voltages UN and/or communication circuits COM serving for connection to a superordinated, measurement data processing system and/or to a fieldbus, are, furthermore, accommodated in a corresponding electronics housing 200, especially an impact—and/or also explosion resistant and/or hermetically sealed, electronics housing 200. The electronics housing 200 of the inline measuring device can be held, for example, directly on the measuring transducer housing 100, to form a measuring device in compact construction. For visualizing, on-site, measured values produced internally in the measuring system and/or, in given cases, measuring system internally generated status reports, such as, for instance, an error report or an alarm, the measuring system can have, furthermore, a display—and operating element HMI communicating, at least at times, with the transmitter electronics, such as, for instance, an LCD, OLED or TFT display placed in the electronics housing behind a window provided correspondingly therein as well as a corresponding input keypad and/or a screen with touch input, such as used in, among other things, also in so-called smartphones. In advantageous manner, the transmitter electronics ME, especially a programmable and/or remotely parameterable, transmitter electronics ME, can additionally be so designed that it can, during operation of the in-line measuring device, exchange data with a superordinated electronic data processing system, for example, a programmable logic controller (PLC), a personal computer and/or a work station, via a data transmission system, for example, a fieldbus system and/or wirelessly via radio, for instance, measuring—and/or other operating data, such as, for instance, current measured values or tuning values serving for control of the inline-measuring device and/or diagnostic values. In such case, the transmitter electronics ME can have, for example, an internal energy supply circuit ESC, which is fed, during operation, via the aforementioned fieldbus system, from an external energy supply provided in the data processing system. In an embodiment of the invention, the transmitter electronics is additionally so embodied that it is electrically connectable with the external electronic data processing system by means of a two-wire connection 2L, for example, a two-wire connection 2L configured as a 4-20 mA current loop, and can be supplied thereby with electrical energy as well as transmit therethrough measured values to the data processing system. For the case, in which the measuring system is provided for coupling to a fieldbus—or some other communication system, the transmitter electronics ME can have a corresponding communication interface COM for data communication according to one of the relevant industry standards. The electrical connecting of the measuring transducer to the mentioned transmitter electronics can occur by means of corresponding connecting lines, which lead from the electronics housing 200, for example, via cable feedthrough, and extend at least sectionally within the measuring transducer housing. The connecting lines can, in such case, be embodied at least partially as electrical line wires encased, at least sectionally, in an electrical insulation, e.g. electrical line wires in the form of "twisted pair" lines, flat ribbon cables and/or coaxial cables. Alternatively thereto or in supplementation thereof, the connecting lines can, at least sectionally, be formed also by means of conductive traces of a circuit board, especially a flexible circuit board, in given cases, a lacquered circuit board; compare, for this, also the initially mentioned U.S. Pat. No. 6,711,958 or U.S. Pat. No. 5,349,872.

Figure 4:
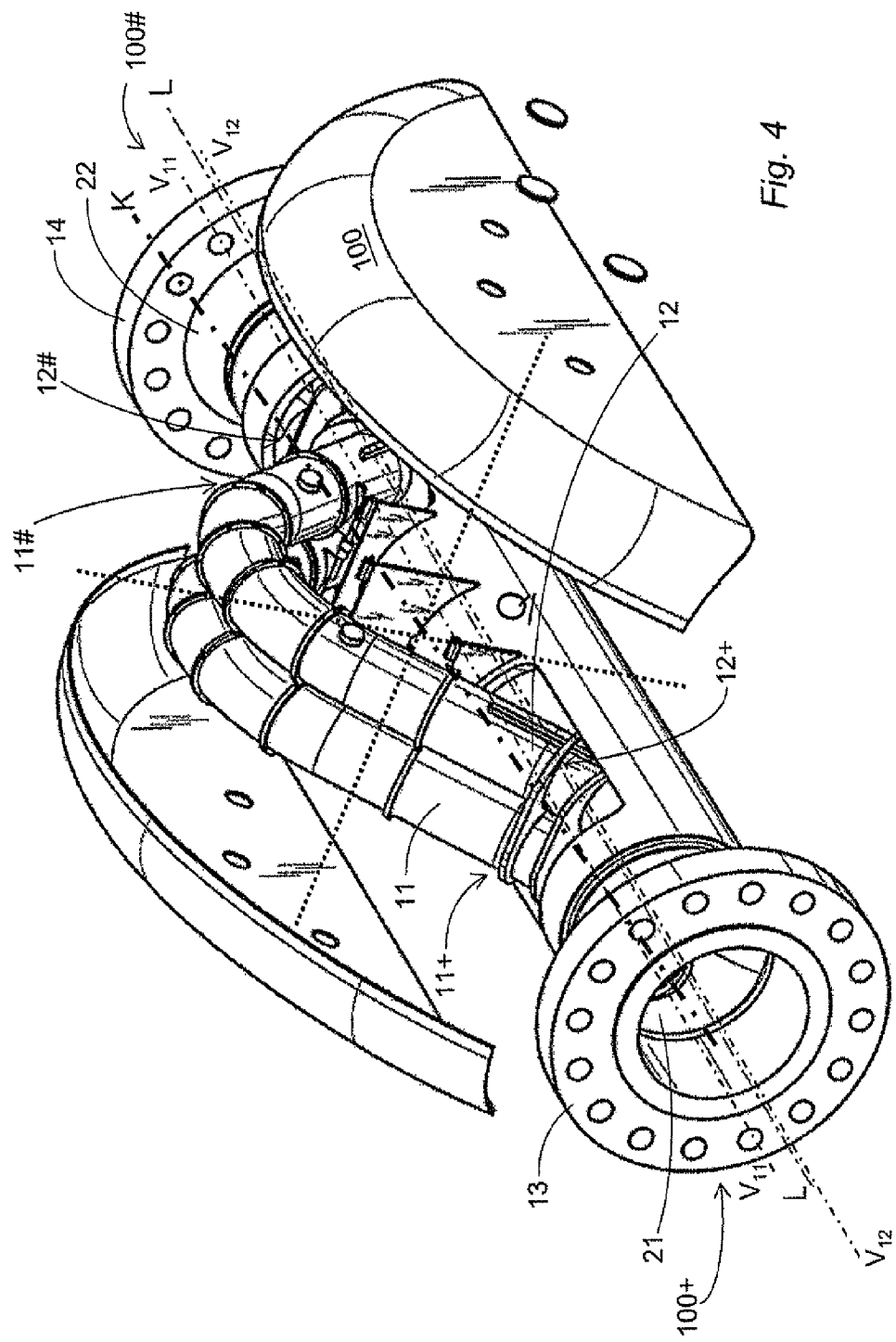
FIGS. 4 and 5 show partially sectioned, perspective views of a measuring transducer of vibration-type, especially also a measuring transducer of vibration-type suited for a measuring system according to FIGS. 1 and 2 and having a tube arrangement formed by means of two tubes.
Figure 5:
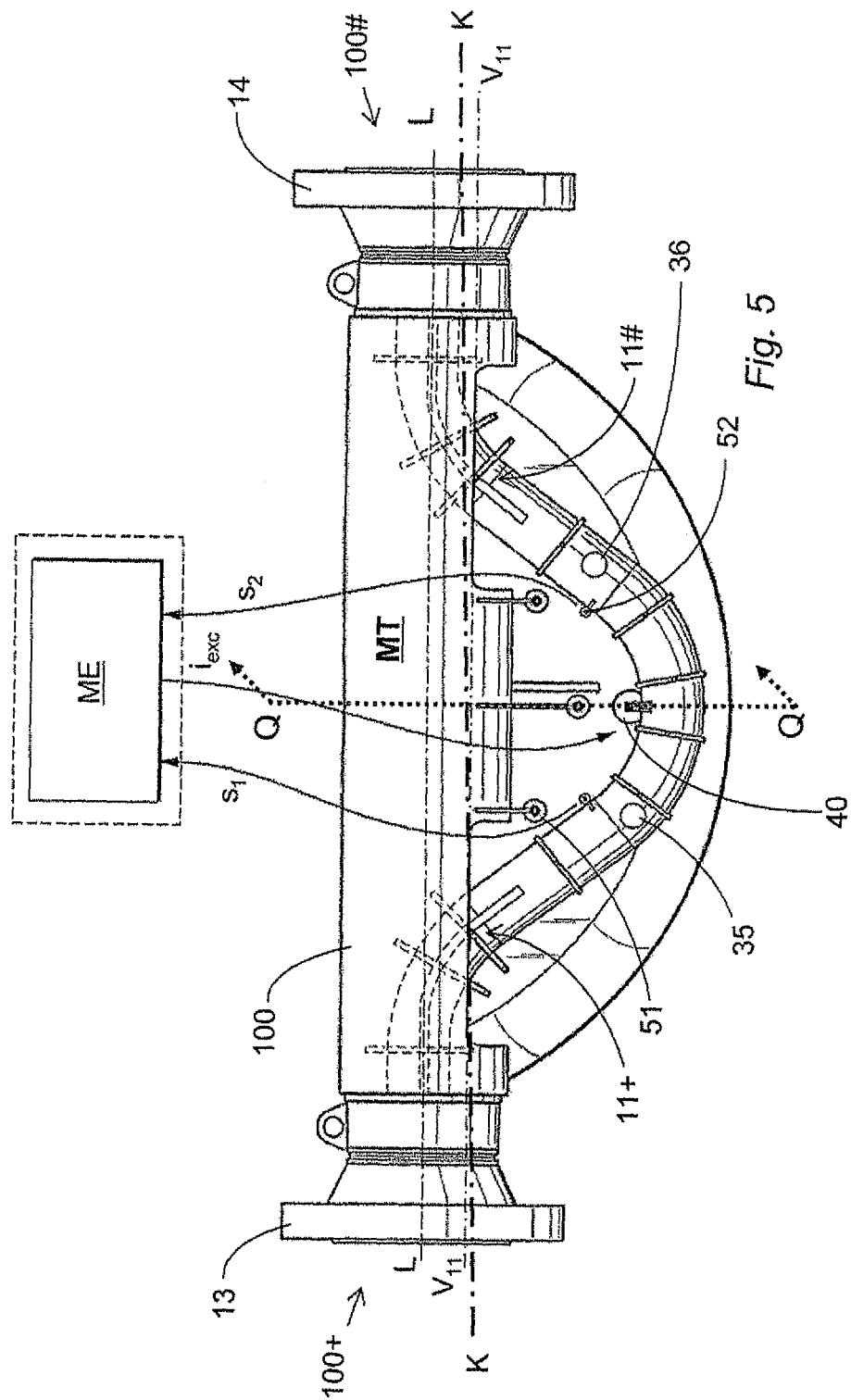

Schematically shown in FIGS. 4 and 5 additionally is an example of an embodiment of a measuring transducer MT suited for implementing the measuring system. The measuring transducer MT shown here is embodied as a measuring transducer of vibration-type and serves generally for producing in a through flowing medium, for instance, a gas and/or a liquid, mechanical reaction forces, e.g. mass flow dependent, Coriolis forces, density dependent, inertial forces and/or viscosity dependent, frictional forces, which react registerably by sensor, and, insofar, also measurably, on the measuring transducer. Derived from these reaction forces, e.g. the parameters, mass flow rate m, density ρ and viscosity η of the medium can be measured.

For registering the at least one parameter, the measuring transducer comprises an inner part arranged in a measuring transducer housing 100 and driven during operation by the transmitter electronics ME, which effects the physical-to-electrical transducing of the at least one parameter to be measured.

For conveying the flowing medium, the inner part, and, thus, the measuring transducer, shown here, includes, in an embodiment of the invention, additionally, an inlet-side, first flow divider 21 having at least two mutually spaced flow openings 21A, 21B and serving for dividing inflowing medium into two flow portions, an outlet-side, second flow divider 22 having at least two mutually spaced flow openings 22A, 22B and serving for guiding the flow portions back together, as well as at least two tubes 11, 12 connected to the flow dividers 21, 22, especially equally-constructed flow dividers 21, 22, to form a tube arrangement having at least two flow paths connected for parallel flow and to serve ultimately as measuring tubes, through which the medium to be measured flows. In such case, a first tube 11 opens with an inlet-side, first tube end into a first flow opening 21A of the first flow divider 21 and with an outlet-side, second tube end into a first flow opening 22A of the second flow divider 22 and a second tube 12 with an inlet-side, first tube end into a second flow opening 21B of the first flow divider 21 and with an outlet-side, second tube end into a second flow opening 22B of the second flow divider 202, so that, thus, in the case of this embodiment of the invention, medium flows through the two (measuring-) tubes (which are also mechanically coupled with one another) simultaneously and in parallel in the undisturbed operation of the measuring system. The two tubes 11, 12 can be connected with the flow dividers, for example, by material bonding, for instance, by welding or brazing or soldering, or also by force, e.g. friction, interlocking, for instance, by roll expansion according to the initially mentioned U.S. Pat. No. 5,610,342. In the example of an embodiment shown here, the flow dividers are integral components of the measuring transducer housing, as the first flow divider forms an inlet-side, first housing end defining the inlet end 100+ of the measuring transducer and the second flow divider an outlet-side, second housing end defining the outlet end 100# of the measuring transducer. For the typical case, in which the measuring transducer MT is to be assembled releasably with the process line, for example, a process line in the form of a metal pipeline, there are provided on the inlet side of the measuring transducer a first connecting flange 13 for connecting to a line segment of the process line supplying medium to the measuring transducer and on the outlet side a second connecting flange 14 for connecting to a line segment of the process line removing medium from the measuring transducer. The connecting flanges 13, 14 can, in such case, as quite usual in the case of measuring transducers of the described type, also be welded to the respective housing ends and, insofar, be integrated terminally into the measuring transducer housing 100.

In the example of an embodiment shown here, each of the two tubes 11, 12 extending, in each case, between its inlet-side, first tube end 11+, respectively 12+, and its outlet-side, second tube end 11#, respectively 12#, with an—essentially freely oscillating—wanted-oscillatory length, is, additionally, at least sectionally, curved. For producing the aforementioned, reaction forces, each of the two tubes is caused, during operation, to vibrate, at least over its oscillatory length—with, for example, equal oscillation frequency as the, respectively, other tube, however, opposite-equally thereto—and, in such case, is repeatedly elastically deformed oscillatingly about a static resting position. The respective oscillatory lengths correspond, in such case, to a length of an imaginary middle—or also centroidal, axis (imaginary connecting line through the centers of gravity of all cross sectional areas of the respective tube) extending within the lumens of the tubes, in the case of a curved tube, thus, a stretched length of the respective tube 11, 12. According to an additional embodiment of the invention, each of the tubes is so caused to vibrate during operation that each oscillates, especially in a bending oscillation mode, about an oscillation axis, which is, in each case, parallel to one of the two imaginary connecting axis V11, or V12 imaginarily connecting the respective tube ends 11+, 11#, and 12+, 12#.

The tubes, for example, tubes oscillating essentially opposite-equally to one another during operation, are, furthermore, mechanically connected with one another on the inlet side by means of a first coupling element 25, for example, a plate-shaped, first coupling element 25, to form a first coupling zone and on the outlet side by means of a second coupling element 26, for example, a plate-shaped, second coupling element 26, to form a second coupling zone. Thus, here, the first coupling zone defines, in each case, an inlet-side, first tube end 11+, 12+ adjoining the inlet side of the wanted oscillatory length of each of the two tubes 11, 12, and the second coupling zone, in each case, an outlet-side, second tube end 11#, 12# of the respective tubes 11, 12. As additionally evident from the combination of FIGS. 4 and 5, the coupling element 25 is arranged equally far from the first housing end of the measuring transducer housing, as the second coupling element 26 is from the second housing end of the measuring transducer housing. Each of the measuring tubes is, in the example of an embodiment shown here, additionally so formed and arranged in the measuring transducer that its aforementioned connecting axis extends essentially parallel to an imaginary longitudinal axis L of the measuring transducer imaginarily connecting the in—and outlet ends of the measuring transducer. Each of the measuring transducer measuring tubes (manufactured, for example, of stainless steel, titanium, tantalum, or zirconium or an alloy thereof), and, insofar, also an imaginary center line of the respective measuring tube extending within its lumen, can e.g. be embodied essentially U-shaped or, as well as also shown in FIGS. 4 and 5, essentially V-shaped.

As directly evident from the combination of FIGS. 4 and 5, each of the at least two tubes 11, 12 is here additionally, in each case, so formed and arranged that the aforementioned center line, as quite usual in the case of measuring transducers of the type being discussed, lies, in each case, in an imaginary tube plane and the aforementioned two connecting axis V11, V12 extend parallel to one another, and, consequently, perpendicularly to an imaginary middle plane Q of the tube arrangement, for example, also such that the two imaginary tube planes are parallel to one another.

In an additional embodiment of the invention, the tubes 11, 12 and the two coupling elements 25, 26 are additionally so formed and oriented relative to one another that the two coupling elements 25, 26 are equidistant relative to said middle plane of the tube arrangement, such that, consequently, a center of mass M25 of the first coupling element 25 is equally far from said middle plane as is a center of mass M26 of the second coupling element 26. The frequency adjusting effect of coupling elements of the aforementioned type results, in such case, as is known, from the fact that each of the two coupling elements has, in each case, a bending stiffness also about an imaginary longitudinal axis of the tube arrangement imaginarily connecting the center of mass M25 of the first coupling element 25 and the center of mass of the second coupling element 26, especially an imaginary longitudinal axis imaginarily cutting the first coupling element with a same intersection as the second coupling element, which bending stiffness, in each case, produces a contribution to a total stiffness not lastly also dependent on the (individual-) bending stiffnesses the tubes and co-determining the eigenfrequencies of the tube arrangement.

It is to be noted here, additionally, that—although the measuring transducer in the example of an embodiment shown in FIGS. 4 and 5 has two curved measuring tubes and at least, insofar, in its mechanical construction, as well as also in its principle of action, resembles the measuring transducers proposed in U.S. Pat. No. 6,920,798 or U.S. Pat. No. 5,796,011, or also available from Endress+Hauser under the designations "PROMASS E" or "PROMASS F",—the invention, nevertheless, can also be applied to measuring transducers with straight and/or more than two measuring tubes, for example, thus four parallel measuring tubes, for instance, comparable to those shown in the initially mentioned U.S. Pat. No. 5,602,345 or WO-A 96/08697 or, for example, also available from Endress+Hauser under the designation "PROMASS M". Furthermore, the measuring transducer can, however, also be formed by means of a tube arrangement having only a single measuring tube conveying medium during operation, coupled with a blind, or also balancing, tube, comparable thus, for instance, to the measuring transducers shown in U.S. Pat. No. 5,531,126 or U.S. Pat. No. 6,666,098 or, for example, also available from Endress+Hauser under the designation "PROMASS H".

For the active exciting of mechanical oscillations of the at least two tubes, especially also mutually parallel tubes and/or tubes equally-constructed as regards shape and material, especially to one or more of their natural eigenfrequencies dependent on the density of the medium instantaneously conveyed therein, the measuring transducer is additionally provided with an electromechanical exciter mechanism 40, especially an electrodynamic one, thus one formed by means of a plunging armature coil, or solenoid. This serves, operated by an exciter signal, e.g. an exciter signal with a controlled electrical current and/or a controlled voltage, delivered by the driver circuit of the transmitter electronics and, in given cases, correspondingly conditioned by interaction with the measuring and evaluating circuit—, in each case, to convert electrical exciter energy, or power, Eexc fed by means of the driver circuit into an exciter force Fexc acting, e.g. with pulse shape or harmonically, on the at least two tubes and deflecting these in the above-described manner. The exciter force Fexc can, as usual in the case of such measuring transducers, be bidirectional or unidirectional and in manner known to those skilled in the art, be tuned e.g. by means of an electrical current, and/or voltage, control circuit as regards its amplitude and be matched, e.g. by means of a phase control loop (PLL), as regards its frequency, to an instantaneous mechanical eigenfrequency of the tube arrangement. The construction and application of such a phase control loop serving for tuning an exciter frequency, fexc, of the exciter signal to the instantaneous eigenfrequency of the desired wanted mode is described at length e.g. in U.S. Pat. No. 4,801,897. Of course, also other driver circuits, known, per se, to those skilled in the art to be suitable for tuning the exciter energy Eexc, can be used, for example, also those disclosed in the initially mentioned U.S. Pat. No. 4,879,911, U.S. Pat. No. 5,009,109, U.S. Pat. No. 5,050,439, or U.S. Pat. No. 6,311,136. Additionally, as regards application of such driver circuits for measuring transducers of vibration-type, reference is made to the transmitter electronics provided with measurement transmitters of the series, "PROMASS 83", as available from Endress+Hauser, for example, in connection with measuring transducers of the series "PROMASS E", "PROMASS F", "PROMASS M", or also "PROMASS H". Their driver circuit is, for example, in each case, so embodied that the lateral bending oscillations in the wanted mode are controlled to a constant amplitude, thus an amplitude also largely independent of the density, $\rho$.

According to an additional embodiment of the invention, the at least two tubes 11, 12 are actively excited during operation by means of the exciter mechanism, at least at times, in a wanted mode, in which they execute, especially predominantly or exclusively, bending oscillations about the mentioned imaginary oscillation axis, for example, predominantly with exactly one natural eigenfrequency (resonance frequency) of the tube arrangement, such as, for instance, that corresponding to a bending oscillation fundamental mode, in which each of the tubes has exactly one oscillatory antinode within its respective wanted oscillatory length. Especially, in such case, it is additionally provided that each of the tubes, as quite usual in the case of such measuring transducers with curved tubes, is so excited by means of the exciter mechanism to bending oscillations at an exciter frequency fexc that it oscillates in the wanted mode about the mentioned imaginary oscillation axis—, for instance, in the manner of a unilaterally clamped cantilever—, at least partially according to one of its natural bending oscillation forms. The bending oscillations of the tubes actively excited by means of the exciter mechanism have, in such case, in the region of the inlet-side coupling zone defining the respective inlet-side tube ends, an inlet-side oscillation node, and, in the region of the outlet-side coupling zone defining the respective outlet-side tube ends, an outlet-side oscillation node, so that thus the respective tubes extend essentially freely oscillatingly with their oscillatory lengths between these two oscillation nodes.

As quite usual in the case of measuring transducers with a tube arrangement of the type being discussed, the tubes are, in such case, especially so excited by means of the exciter mechanism acting, for example, differentially between the two tubes that they execute during operation, at least at times, and at least partially, opposite-equal bending oscillations about the longitudinal axis L. In other words, the two tubes 11, 12 move, in each case, in manner of tuning fork tines oscillating relative to one another. For this case, according to an additional embodiment of the invention, the exciter mechanism is designed to excite, and, respectively, to maintain, opposite-equal vibrations of the first tube and of the second tube, especially bending oscillations of each of the tubes, about an imaginary oscillation axis imaginarily connecting the respective first tube ends and the respective second tube ends. Serving as exciter mechanism 40 can be, in such case, e.g. an exciter mechanism 40 formed in a conventional manner by means of an electrodynamic oscillation exciter 41—, for example, a single electrodynamic oscillation exciter 41—placed centrally, thus in the region of a half oscillatory length, between the at least two tubes and acting differentially on the tubes. The oscillation exciter 41 can be formed, as indicated in FIG. 4, for example, by means of an cylindrical exciter coil, which is secured on the first tube and through which, during operation, a corresponding exciter current flows, and which, associated therewith, is permeated by a corresponding magnetic field, as well as by means of a permanently magnetic armature at least partially plunging into the exciter coil and affixed externally, especially centrally, on the second tube. Other—also quite suitable for the measuring system of the invention—exciter mechanisms for oscillations of the at least two tubes are shown e.g. in the initially mentioned U.S. Pat. No. 4,680,974, U.S. Pat. No. 4,738,144, U.S. Pat. No. 4,768,384, U.S. Pat. No. 4,801,897, U.S. Pat. No. 4,823,614, U.S. Pat. No. 4,879,911, U.S. Pat. No. 5,009,109, U.S. Pat. No. 5,050,439, U.S. Pat. No. 5,359,881, U.S. Pat. No. 5,602,345, U.S. Pat. No. 5,734,112, U.S. Pat. No. 5,796,011, U.S. Pat. No. 5,926,096, U.S. Pat. No. 5,969,264, U.S. Pat. No. 7,127,952, U.S. Pat. No. 6,092,429, U.S. Pat. No. 6,311,136, U.S. Pat. No. 6,883,387, U.S. Pat. No. 7,325,461, U.S. Pat. No. 7,392,709, or U.S. Pat. No. 7,421,350.

For causing the at least two tubes of the measuring transducer to vibrate, the exciter mechanism 40 is, as already mentioned, fed by means of a likewise oscillating, exciter signal of adjustable exciter frequency fexc so that an exciter current iexc, appropriately controlled in its amplitude, flows, during operation, through the exciter coil of the—here single oscillation exciter acting on the tube 10—, whereby a magnetic field required for moving the tubes is produced. The driver, or also exciter, signal, and, respectively, its exciter current iexc can be formed e.g. harmonically, multifrequently or also rectangularly. The exciter frequency fexc of the exciter current required for maintaining the actively excited vibrations of the tubes can, in the case of the measuring transducer shown in the example of an embodiment, in advantageous manner, be so selected, and set, that the tubes, as already mentioned, oscillate predominantly in a bending oscillation, fundamental mode.

For the operationally provided case, in which medium is flowing in the process line and, thus, the mass flow m in the tube arrangement is different from zero, also Coriolis forces are induced in the through flowing medium by means of the tubes vibrating in the above described manner. These, in turn, react on each tube, through which medium is flowing, and, so, effect an additional deformation of such, registerable by sensor. This deformation is essentially according to an additional natural eigenoscillation form of higher modal order than the wanted mode. An instantaneous embodiment of this so-called Coriolis mode superimposed with equal frequency on the excited, wanted mode is, in such case, especially as regards its amplitude, also dependent on the instantaneous mass flow m. Serving as Coriolis mode can be, as usual in the case of measuring transducers with curved tubes, e.g. the eigenoscillation form of the antisymmetric twist mode, thus that, in the case of which the respectively flowed through tube, as already mentioned, executes also rotary oscillations about an imaginary rotary oscillation axis directed perpendicularly to bending oscillation axis and imaginarily cutting the center line of the respective tube in the region of the half oscillatory length.

The measuring transducer additionally includes a corresponding sensor arrangement 50 for registering vibrations of the tubes, especially also oscillations in the Coriolis mode. This comprises, as also shown schematically in FIGS. 4 and 5, at least a first oscillation sensor 51, for example, an electrodynamic, first oscillation sensor 51 and/or a first oscillation sensor 51 spaced from the at least one oscillation exciter and arranged between the at least two tubes 10, for delivering a first vibration measurement signal s1 of the measuring transducer representing vibrations of at least one of the two tubes, for example, also opposite-equal vibrations of the at least two tubes, for example, a voltage corresponding to the oscillations or an electrical current corresponding to the oscillations. Additionally, according to a further development of the invention, it is provided that the sensor arrangement has at least a second oscillation sensor 52, for example, a second oscillation sensor 52 spaced from the first oscillation sensor 52 and arranged between the at least two tubes 10 and/or an electrodynamic, second oscillation sensor 52, for delivering a second vibration measurement signal s2 of the measuring transducer representing vibrations of at least one of the two tubes, for example, also opposite-equal vibrations of the at least two tubes. The oscillation sensors of the sensor arrangement can in advantageous manner additionally be so embodied that they deliver vibration measurement signals of equal type, for example, in each case, a signal voltage, or a signal current. In the example of an embodiment shown here, the first oscillation sensor 51 is arranged between the at least two tubes 10 on the inlet side and the second oscillation sensor between the at least two tubes 10 on the outlet side, especially the second oscillation sensor 52 is spaced equally from the at least one oscillation exciter, or from the half-length center of the tube 10, as the first oscillation sensor, and in such a manner, that the two sensors differentially register opposite-equal vibrations of the two tubes. The oscillation sensors of the sensor arrangement can, however, for example, also be so embodied and arranged in the measuring transducer that they, as, among other things, provided also in U.S. Pat. No. 5,602,345, register the oscillations relatively to the measuring transducer housing.

Each of the—typically broadband—vibration signals s1, s2 of the measuring transducer MT includes, in such case, a signal component corresponding to the wanted mode with a signal frequency corresponding to the instantaneous oscillation frequency fexc of the tubes oscillating in the actively excited, wanted mode and a phase shift, dependent on the current mass flow of the medium flowing in the tube arrangement, relative to the exciter signal iexc generated, for example, by means of a PLL circuit as a function of a phase difference existing between at least one of the vibration signals s1, s2 and the exciter current in the exciter mechanism. Even in the case of application of a rather broadband exciter signal iexc, as a result of the most often very high oscillation quality factor of the measuring transducer MT, it can be assumed therefrom that the signal component corresponding to the wanted mode of each of the vibration signals predominates over other signal components, especially signal components corresponding to possible external disturbances and/or classified as noise, and, insofar, also is dominating, at least within a frequency range corresponding to the bandwidth of the wanted mode.

The measuring transducer, vibration measurement signals s1, s2, each having a signal component with an instantaneous oscillation frequency fexc of the signal frequency corresponding to the at least two tubes oscillating in the actively excited, wanted mode, are, as well as also shown in FIG. 3, fed to the transmitter electronics ME and therein to the measuring—and evaluating circuit μC, where they are first preprocessed, especially preamplified, filtered and digitized by means of a corresponding input circuit FE, in order then to be able to be suitably evaluated. Applied as input circuit FE, as well as also as measuring—and evaluating circuit μC, can, in such case, be circuit technologies already applied and established in conventional Coriolis, mass flow, measuring devices, for example, also such applied according to the initially mentioned state of the art, for the purpose of making use of the vibration signals, and, particularly, for instance, ascertaining mass flow rates and/or totalled mass flows, etc. According to an additional embodiment of the invention, the measuring—and evaluating circuit μC is accordingly also provided by means of a microcomputer in the transmitter electronics ME, for example, implemented by means of a digital signal processor (DSP), and by means of program-code correspondingly implemented and running therein. The program code can be stored persistently e.g. in a non-volatile data memory EEPROM of the microcomputer and loaded at the booting of the same into a volatile data memory RAM, e.g. one integrated in the microcomputer. Suitable processors for such applications include e.g. those of type TMS320VC33, as available from the firm, Texas Instruments Inc. Of course, the vibration signals s1, s2 are, as already indicated, converted by means of corresponding analog to digital-converters A/D of the transmitter electronics ME into corresponding digital signals for processing in the microcomputer; compare, for this, for example, the initially mentioned U.S. Pat. No. 6,311,136 or U.S. Pat. No. 6,073,495 or also the aforementioned measurement transmitters of the series "PROMASS 83".

The transmitter electronics ME, respectively the therein contained measuring—and evaluating circuit μC, serves, in such case, according to an additional embodiment of the invention, with application of the vibration measurement signals s1, s2 delivered by the sensor arrangement 50, for example, based on a phase difference detected between the vibration signals s1, s2 of the first and second oscillation sensor 51, 52 generated in the case of tube 10 oscillating partially in the wanted—and partially in the Coriolis mode, recurringly to ascertain a mass flow, measured value Xm, which represents a mass flow rate of the medium flowing in the measuring transducer. For such purpose, the transmitter electronics produces during operation, according to an additional embodiment of the invention, recurringly a phase difference, measured value $x_{\Delta\phi}$, which represents, instantaneously, the phase difference $\Delta_\phi$ existing between the first vibration signal s1 and the second vibration signal s2. Alternatively to, or in supplementation of, ascertaining the mass flow, measured value Xm, the transmitter electronics ME of the measuring system can also serve to produce, derived from an instantaneous oscillation frequency, especially that of the actively excited, wanted mode, especially an instantaneous oscillation frequency based on the vibration measurement signals or ascertained from the exciter signal, a density measured value, which represents a density of the medium flowing in the measuring transducer. Additionally, the transmitter electronics ME can, as quite usual in the case of in-line measuring devices of the type being discussed, be used in given cases, also to ascertain a viscosity measured value $x_\eta$ representing a viscosity of the medium flowing in the measuring transducer; compare, for this, also the initially mentioned U.S. Pat. No. 7,284,449, U.S. Pat. No. 7,017,424, U.S. Pat. No. 6,910,366, U.S. Pat. No. 6,840,109, U.S. Pat. No. 5,576,500 or U.S. Pat. No. 6,651,513. Suited for ascertaining the exciter energy or excitation power, or damping, required for determining viscosity is, in such case, for example, the exciter signal delivered by the driver circuit of the transmitter electronics, especially an amplitude and frequency of its electrical current component driving the wanted mode or also an amplitude of the total exciter current, in given cases, also normalized on an oscillation amplitude ascertained based on at least one of the vibration signals. Alternatively thereto or in supplementation thereof, however, also an internal control signal serving for tuning the driver signal, or the exciter current, or, for example, in the case of exciting the vibrations of the at least one tube with an exciter current of fixedly predetermined amplitude, or an amplitude controlled to be constant, also at least one of the vibration signals, especially an amplitude thereof, can serve as a measure of the exciter energy or excitation power, or attenuation, or damping, required for ascertaining the viscosity measured value.

As already mentioned, there is in the case of tube arrangements of the type being discussed, consequently also measuring transducers of vibration-type formed therewith, a special requirement that one or more of their eigenfrequencies—particularly also the eigenfrequency of the mentioned wanted mode—, in each case, be adjusted as exactly as possible to a target eigenfrequency predetermined for the respective eigenmode under defined reference conditions. Serving as reference can be, in such case, for example, a tube arrangement open to the atmosphere, consequently one conveying only air, at room temperature, for example, thus, about 20° C., consequently the target eigenfrequencies, in each case, correspondingly ascertained for such a tube arrangement earlier. Moreover, it is also of considerable interest for tube arrangements of the type being discussed, to prevent, or to compensate, asymmetries of mass, and/or stiffness, distributions within the tube arrangement, which lead to, or favor, undesired development of asymmetric oscillation modes, for instance, in the manner of a kind of Coriolis mode, even in the case of a tube arrangement lacking flowing medium. The method of the invention aims, thus, to increase the precision, with which such adjustment of a tube arrangement formed by means of one or more tubes, consequently by means of one or more measuring tubes (or also, in given cases, blind, or balancing, tubes) as regards at least one target eigenfrequency is performed, and to make said adjustment as simple as possible.

For such purpose, in the case of the measuring transducer of the invention, it is provided, first of all, that the two coupling elements 25, 26 are so embodied, consequently also so arranged and oriented, that the bending stiffness of the first coupling element 25 about the above mentioned imaginary longitudinal axis K of the tube arrangement imaginarily connecting the centers of mass M25, M26 of the coupling elements 25, 26 with one another deviates from the bending stiffness of the second coupling element 26 about said imaginary longitudinal axis K of the tube arrangement. Especially, it is provided, in such case, that the dependence of the at least one target eigenfrequency on said bending stiffnesses of the two couplers 25, 26, or on the deviation of the two bending stiffnesses from one another, is increased by the feature that the bending stiffness of the first coupling element 25 deviates by more than 0.1% of the bending stiffness of the second coupling element 26 from said bending stiffness of the second coupling element 26. In an additional embodiment of the invention, the two coupling elements 25, 26, are, furthermore, so embodied and arranged, consequently so oriented relative to one another, that said imaginary longitudinal axis K of the tube arrangement imaginarily intersects the first coupling element 25 with the same angle of intersection as it does the second coupling element 26, especially, in each case, at a same smallest angle of intersection.

In an additional embodiment, the two coupling elements 25, 26 are so embodied and so arranged relative to one another as well as relative to the tubes that, as a result, the mentioned imaginary longitudinal axis K of the tube arrangement imaginarily connecting the centers of mass M25, M26 of the two coupling elements 25, 26, is not perpendicular to the mentioned imaginary central plane Q of the tube arrangement, for example, thus imaginarily intersects said imaginary central plane Q of the tube arrangement at an angle, which amounts to 89° or less. In other words, the imaginary longitudinal axis K thus intersects the imaginary central plane Q imaginarily at an angle, which is less than 90°, for example, thus amounts to less than 89°. As a result of this, thus, the longitudinal axis K is also not parallel to the mentioned longitudinal axis L of the measuring transducer.

As a result of the aforementioned intentionally sought deviation of the bending stiffnesses of the two couplers from one another, it is possible to cancel in very simple, equally as well very effective, manner, with targeting, even smallest deviations of one or more of the other components, deviations lying within usually accepted tolerance ranges, for instance, of one of the tubes and/or of one of the oscillation sensors of the tube arrangement, from respective nominal, ideal dimensions ultimately influencing the aforementioned mass and/or stiffness distribution, and thus to cancel associated imbalances within the tube arrangement as a result of non-ideal mass, and/or stiffness, distributions resulting from said deviations. This can occur in especially advantageous manner, for example, even after the tube arrangement has been assembled or even after the tube arrangement has been placed in the measuring transducer housing 100 (wherein the measuring transducer housing is, of course, in such case, still not completely closed, so that its interior can still be accessed to a sufficient degree), by lessening the bending stiffness of the relevant coupling element by subsequent removing of volume, and thus correspondingly changing the eigenfrequencies co-determined thereby.

Taking this into consideration, according to an additional variant of the invention, it is, furthermore, provided that, after both the first coupling element 25 as well as also the second coupling element 26 have been connected, respectively, with the first tube 11 and the second tube 12, material is, to a certain extent, removed from at least one of the coupling elements 25, 26, consequently volume 25' is removed therefrom, in order so correspondingly to reduce the bending stiffness of the respective coupling element, in order to cause the bending stiffnesses of the at least two coupling elements correspondingly to deviate from one another. Accordingly, the tube arrangement has, after the coupling elements have been connected with the first and second tubes, initially a preliminary eigenfrequency—hereinafter referred to as an interim eigenfrequency—co-determined by the coupling elements, particularly by the respective bending stiffnesses of each of the coupling elements about the imaginary longitudinal axis of the tube arrangement imaginarily intersecting the first coupling element with the same angle of intersection as it does the second coupling element, and deviates from a target eigenfrequency predetermined, or desired, for the tube arrangement.

The interim eigenfrequency of the tube arrangement can be ascertained, for example, very simply and, to a good approximation, quantitatively, by—, for example, with introduction of a corresponding exciter force via an exciter mechanism—causing the tube, or the tube arrangement formed therewith, to vibrate at said interim eigenfrequency in a natural eigenmode corresponding thereto. Then, a discrepancy between such instantaneous interim eigenfrequency and the target eigenfrequency earlier determined, or expected, for said eigenmode is ascertained based on a corresponding frequency measurement. Therefore, it is provided, according to an additional embodiment of the invention, that the tube—, for instance, tube arrangement having the tube after its manufacture, in given cases, even with the tube arrangement already placed in its ultimate installed position in the measuring transducer housing 100—is caused to vibrate for the purpose of ascertaining the at least one interim eigenfrequency of the tube arrangement; this being done, especially, also before performing the step of removing volume of the particular coupling element.

In an additional embodiment of the invention, the coupling elements, particularly also for the aforementioned case, in which volume of at least one of the coupling elements is to be removed, initially, thus directly before, or after, assembly of the tube arrangement, are first so dimensioned, that said interim eigenfrequency is greater than the desired target eigenfrequency, or, respectively, that the desired target eigenfrequency is less than the interim eigenfrequency.

The removing of volume from the coupling element 25, or 26, can occur, for example, successively, namely performed sufficiently long and/or repeated sufficiently often that corresponding testing—, in given cases, also repeatedly performed testing—shows that the interim eigenfrequency has reached the lower target eigenfrequency predetermined for the tube arrangement. On the basis of these considerations, the removing of volume from at least one of the coupling elements 25, or 26, is, according to an additional embodiment of the invention, performed sufficiently long, and/or repeated sufficiently often, that the interim eigenfrequency is tuned to the target eigenfrequency predetermined for the tube arrangement a frequency lower than the interim eigenfrequency. Alternatively thereto or in supplementation thereof, the removing of volume from at least one of the coupling elements 25, or 26, can also be performed sufficiently long, and/or repeated sufficiently often, that imbalances possibly occurring in the tube arrangement after its assembly are reduced to a predetermined measure of tolerance.

Accordingly, in an additional embodiment of the invention, it is further provided that, for example, before and/or during the removing of volume, at least one of the tubes is caused to vibrate for ascertaining the interim eigenfrequency, i.e. said vibrations of the at least one of the tubes is correspondingly registered and evaluated as regards oscillation frequency. Derived from the aforementioned frequency measurement, it is possible, for instance, using the typically sufficiently known functional dependence of the mechanical eigenfrequencies of the tube arrangement on the instantaneous bending stiffness of the relevant coupling element as well as the mass and mass distribution of the tube arrangement, to ascertain, sufficiently exactly, the volume still correspondingly to be removed for reaching the desired eigenfrequency, or the accordingly desired bending stiffness of the coupling element, after installation of the readied tube arrangement, or after manufacture of the inner part.

Used for introducing, via exciter mechanism 40, exciter forces required for causing the tube to vibrate for the frequency measurement, as well as also for detecting therefrom resulting vibrations of the tube, can be, in the case of readied inner part, for example, the transmitter electronics already intended for the measuring system in its final manufactured state, or, however, even a comparable test electronics remaining subsequently with the manufacturer.

Figure 6:
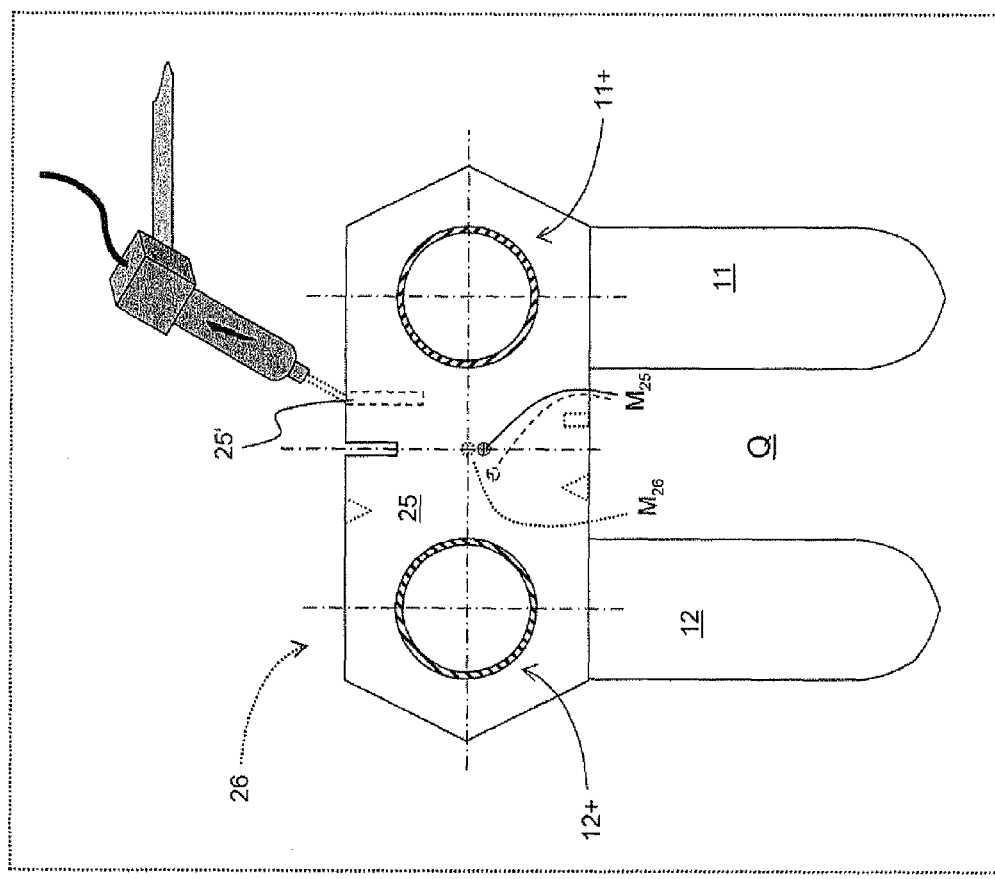
FIG. 6 is a section of a tube arrangement, especially a tube arrangement also suited for a measuring transducer according to FIGS. 4, 5, with a coupling element affixed to two tubes.

The removing, per se, can occur, for example, by separating, and/or grinding, away, edge located volume from the respective coupling element, by introducing one or more notches, in given cases also equidistantly spaced notches, by introducing holes (for example, holes of circular or elongated cross section), and/or—as also schematically presented in FIG. 6—by introducing one or more slits, or slots, into the particular coupling element, in given cases slits, or slots, which are mutually parallel to and/or equidistant from, one another. Particularly for the case quite usual for measuring transducers of the type being discussed, in which the coupling elements are formed, in each case, by means of flat, planar plates (for example, metal plates), it is provided, for the purpose of influencing eigenfrequencies of the tube arrangement, that volume is removed from a region of said coupling element 25, or 26 extending between the first and second tubes.

A variant, particularly well suited also for the batch production of measuring transducers of the type being discussed, for the targeted removing of volume from least one of the coupling elements is shown schematically in FIG. 7. In such case, at least the—correspondingly prepared—coupling element 25 has, in a region extending between the first and second tubes, two or more, mutually spaced perforations 25a, 25b, 25c. The perforations 25a, 25b, 25c can—as shown here schematically—be lined up along an imaginary line extending imaginarily between the first and second tubes. For example, the imaginary line can be a center line of the coupling element 25. Between each two neighboring perforations, there extends a web, or isthmus, of material separating said perforations from one another. Each web is of the same material as the remainder of the coupling element 25.

The actual removing of volume occurs in such case by removing at least one of the webs 25" between two neighboring perforations, for example, by melting and/or evaporating of its material brought about by means of local heating of said web. In advantageous manner, the web 25" is, in such case, completely eliminated, so that, thereafter, the two neighboring perforations originally separated from one another are united to form a single perforation 25a.

The webs, and, respectively, the original perforations formed therebetween, can be formed in the relevant coupling element, for example, in a production step lying, in time, before the joining together of the tubes by way of the respective coupling element, thus also before the actual removing of volume, for example, by corresponding punching of material from the plate ultimately serving as coupling element. The original perforations can be embodied, in such case, for example, to be equally large. Equally, also the webs formed therebetween can all have the same size, so that, as a result, at least before the removing of volume from the respective coupling element, there is a regular perforating of said coupling element. It can, however, also be quite advantageous to construct the perforations and/or the webs non uniformly, consequently to make the perforating of the respective coupling element irregular, for instance, for the purpose of compensating a stiffness distribution of the coupling element extending non-uniformly along the mentioned center line, or for the purpose of adapting a resilience of the coupling element non-uniformly distributed along the mentioned center line but conducive for reaching a target eigenfrequency.

For removing volume from at least one of the coupling elements 25, 26, laser light can be used, applied e.g. by means of a gas laser, such as, for instance, a CO2 laser, by means of a solid laser, such as, for instance, a pulsed ND:YAG laser, or also by means of a fiber laser. The application of laser light introduces, among other things, also the advantage that said removing of volume from the respective coupling element can be performed largely automatically, for example, by means of robots, and even in the presence of vibrating tube, In the latter case, for example, alternately a defined volume can be removed and thereafter, without delay, it can be detected, based on the then correspondingly excited vibrations, whether the tube arrangement has already been trimmed to the target eigenfrequency, or an instantaneous deviation of the current interim—eigenfrequency from the desired target eigenfrequency can be continuously registered and, by correspondingly "metered", further removing of volume—, for instance, by cutting of one or more further slits, or slots—be further reduced to an acceptable value for the deviation. Alternatively, or in supplementation, to laser light, it is possible, for example, however, also to apply a chip removing tool, in given cases also an only manually actuated, chip removing tool, such as, for instance, a file, or a chip removing method, for removing volume from the respective coupling element.

Through the above-described removing of volume from the coupling element, the deviation of the bending stiffnesses of both coupling elements desired, for instance, for the purpose of adjusting eigenfrequencies and/or for the purpose of compensation of imbalances, can be very simply brought about, to the extent fitting for the particular tube arrangement. Thus, for instance, the eigenfrequencies co-determined thereby can be very precisely set, namely appropriately lessened. This, especially, also, so that, ultimately, the aforementioned bending stiffness of the first coupling element about the above mentioned imaginary longitudinal axis of the tube arrangement imaginarily connecting the centers of mass of the two coupling elements 25, 26 with one another deviates by the desired magnitude from the aforementioned bending stiffness of the second coupling element about said longitudinal axis.

Although the invention has been explained above only with reference to one, or two, coupling element(s), it is to be noted here that, of course, particularly also for the purpose of additional improving of the precision, with which the target eigenfrequency is set, and/or for the purpose of being able to trim, selectively, respective eigenfrequencies for different eigenmodes—, for instance, that corresponding to the wanted mode, or that of the Coriolis mode—, also other coupling elements of the type being discussed provided, in given cases, supplementally in the tube arrangement can also be reduced as regards their bending stiffness by subsequent removing of volume and so can be correspondingly taken into consideration in the late adjusting of the eigenfrequencies of the tube arrangement. Moreover, in case required, supplementally to the above described reducing of bending stiffnesses of coupling elements, also discrete supplemental masses 35, 36 can be placed on the tubes 11, or 12, in order, on their part, likewise to provide a contribution lowering, for instance, even selectively as a function of mode, eigenfrequencies of the tube arrangement.

The invention claimed is:

1. A measuring transducer of the vibration-type for producing vibration signals corresponding to parameters of a flowing medium, especially a mass flow rate, a density and/or a viscosity, which measuring transducer, comprises:
   a measuring transducer housing having a first housing end and a second housing end; and
   a tube arrangement formed by means of at least two tubes extending within said measuring transducer housing from its first housing end to its second housing end, especially equally constructed tubes and/or tubes extending parallel to one another, wherein:
   at least a first tube, especially a first tube vibrating during operation, is embodied as a measuring tube serving for conveying flowing medium; and
   a second tube, especially a second tube vibrating during operation, is mechanically connected with said first tube by means of a first coupling element, especially a plate-shaped, first coupling element, to form an inlet-side, first coupling zone and by means of a second coupling element, especially a plate-shaped second coupling element, to form an outlet-side, second coupling zone;

said first coupling element is arranged equally far removed from said first housing end as said second coupling element is from said second housing end, and said first coupling element has, about an imaginary longitudinal axis of the tube arrangement imaginarily connecting a center of mass of said first coupling element and a center of mass of said second coupling element, especially imaginarily intersecting said first coupling element with an angle of intersection equal to that with said second coupling element, a bending stiffness, which deviates from a bending stiffness of said second coupling element about said imaginary longitudinal axis of the tube arrangement, especially a bending stiffness, which deviates by more than 0.1% of said bending stiffness of said second coupling element.

2. The measuring transducer as claimed in claim 1, wherein:
the imaginary longitudinal axis of the tube arrangement imaginarily intersects said first coupling element at a same smallest angle of intersection as it does said second coupling element.

3. The measuring transducer as claimed in claim further comprising:
an electromechanical exciter mechanism mechanically coupled with the tube arrangement, especially mounted on said first and said second tubes, for effecting vibrations, especially opposite equal bending oscillations, of the at least two tubes, especially in such a manner that said first tube executes, at least partially, bending oscillations about a first imaginary bending oscillation axis of the tube arrangement and said second tube at least partially bending oscillations about a second imaginary bending oscillation axis of the tube arrangement parallel to the first imaginary bending oscillation axis.

4. The measuring transducer as claimed in claim 1, further comprising:
a sensor arrangement for registering vibrations, especially bending oscillations, of at least one of said tubes and for producing at least one vibration signal representing said vibrations.

5. The measuring transducer as claimed in claim 1, wherein:
said first tube extends parallel to said second tube.

6. The measuring transducer as claimed in claim 1, wherein:
said first tube and said second tube are of equal construction as regards shape and material.

7. The measuring transducer as claimed in claim wherein:
each of said tubes is one of: curved, especially U-shaped or V-shaped, and straight.

8. The measuring transducer as claimed in claim 1, wherein:
a first imaginary connecting axis, which imaginarily connects a first tube end of said first tube and a second tube end of said first tube, is both parallel to a second imaginary connecting axis, which imaginarily connects a first tube end of said second tube and a second tube end of said second tube, as well as also perpendicular to an imaginary central plane of said tube arrangement.

9. The measuring transducer as claimed in claim 8, wherein:
the imaginary longitudinal axis of said tube arrangement imaginarily connecting the center of mass of said first coupling element and the center of mass of said second coupling element is not perpendicular to said imaginary central plane of said tube arrangement, but imaginarily intersects said imaginary central plane of said tube arrangement at an angle, which amounts to less than 89°.

10. The measuring transducer as claimed in claim 8, wherein:
the imaginary longitudinal axis of said tube arrangement imaginarily connecting the center of mass of said first coupling element and the center of mass of said second coupling element imaginarily intersects said imaginary central plane of said tube arrangement at an angle, which is less than 90°, and especially amounts to less than 89°.

11. The measuring transducer according to claim 1, wherein:
said second tube is embodied as a measuring tube serving conveying flowing medium.

12. The measuring transducer according to claim 1, further comprising:
an inlet-side, first flow divider with at least two flow openings spaced from one another, as well as
an outlet-side, second flow divider with at least two flow openings spaced from one another, wherein:
in order to form a tube arrangement with at least two flow paths connected for parallel flow, said at least two tubes are connected to said flow dividers, especially equally-constructed, flow dividers, in such a manner that the first tube opens with an inlet-side, first tube end into a first flow opening of said first flow divider and with an outlet-side, second tube end into a first flow opening of said second flow divider; and
the second tube opens with an inlet-side, first tube end into a second flow opening of said first flow divider and with an outlet-side, second tube end into a second flow opening of said second flow divider.

13. The measuring transducer as claimed in claim 12, wherein:
said first housing end of said measuring transducer housing by means of a first flow divider and said second housing end of said measuring transducer housing by means of a second flow divider formed.

14. The measuring transducer as claimed in claim 1, wherein:
at least the first coupling element has, in a region extending between the first and second tubes, two or more, mutually spaced perforations, especially perforations lined up along an imaginary line imaginarily extending between the first and second tubes and/or differently sized perforations.

15. The measuring system for a medium flowing in a pipeline, especially a medium in the form of an aqueous liquid, a slurry, a paste or other flowable material, which measuring system, especially a measuring system embodied as a compact-measuring device and/or as a Coriolis, mass flow measuring device, comprises:
a measuring transducer through which the medium flows during operation as claimed in claim 1, and
a transmitter electronics electrically coupled with the measuring transducer for activating the measuring transducer and for evaluating vibration signals delivered from said measuring transducer.

16. A method for manufacturing a measuring transducer of the vibration-type, wherein the measuring transducer has a measuring transducer housing with a first housing end and a second housing end; as well as a tube arrangement formed by means of at least two tubes extending within the measuring transducer housing from its first housing end to its second housing end, of which at least two tubes, the method comprising the steps of:

embodying a first tube, especially a first tube vibrating during operation, as a measuring tube serving for conveying flowing medium, and mechanically connecting a second tube, especially a second tube during vibrating operation, with the first tube by means of a first coupling element, especially a plate-shaped, first coupling element, to form an inlet-side, first coupling zone and by means of a second coupling element, especially a plate-shaped, second coupling element, to form an outlet-side, second coupling zone;

connecting the first coupling element with the first tube and the second tube as well as the second coupling element with the first tube and the second tube; and removing volume from at least one of the coupling elements, especially from a region of said coupling element extending between the first and second tubes, after said coupling element is connected with the first and second tubes, especially in such a manner that the first coupling element has a bending stiffness (about an imaginary longitudinal axis of the tube arrangement imaginarily intersecting the first coupling elements with the same angle as it intersects the second coupling element), which deviates from a bending stiffness of the second coupling element about said imaginary longitudinal axis of the tube arrangement by more than 0.1% of said bending stiffness of the second coupling element.

17. The method as claimed in claim 16, wherein:

the tube arrangement has, after the coupling elements are connected with the first and second tubes, an interim eigenfrequency co-determined by the coupling elements, especially by respective bending stiffness of each of the coupling elements about an imaginary longitudinal axis of the tube arrangement imaginarily intersecting the first coupling elements with the same angle of intersection as it does the second coupling element; and the removing of volume from at least one of the coupling elements is performed until, and/or repeated until, the interim eigenfrequency is tuned to a target eigenfrequency predetermined for the tube arrangement and lower than the interim eigenfrequency.

18. The method as claimed in claim 16, further comprising the steps of:

a step of detecting whether the tube arrangement is trimmed to the target eigenfrequency, especially based on at least one mechanical eigenfrequency of the tube arrangement measured in the case of vibrating tube; and/or a step of ascertaining to what extent the interim eigenfrequency of the tube arrangement deviates from the target eigenfrequency, especially based on at least one mechanical eigenfrequency of the tube arrangement measured in the case of vibrating tube.

19. The method as claimed in claim 16, further comprising: a step of causing at least one of the tubes to vibrate for ascertaining the interim eigenfrequency.

20. The method as claimed in claim 16, wherein:

laser light is used for removing volume from the at least one coupling element, especially laser light applied by means of a gas laser, by means of a solid laser or also by means of a fiber laser.

21. The method as claimed in claim 16, wherein:

the removing of volume from the at least one coupling element comprises a step of introducing at least one slit, or slot, into said coupling element.

22. The method as claimed in claim 16, wherein:

the removing of volume from the at least one coupling element comprises a step of grinding at least one notch into the coupling element.

23. The method as claimed in claim 16, further comprising: a step of forming two or more mutually spaced perforations in at least one of the coupling elements, especially perforations lined up along an imaginary line and/or differently sized perforations, especially wherein the step of forming is performed, in time, before the removing of volume from the at least one of the coupling elements.

24. The method as claimed in claim 16, wherein:

the removing of volume from the at least one of the coupling elements further comprises an at least partial removing, especially a melting and/or an evaporating, of a web extending between two neighboring perforations of the coupling element, especially in such a manner that, thereafter, the two neighboring perforations are united to form a single perforation.

25. The method as claimed in claim 16, wherein:

the removing of volume from the at least one of the coupling elements further comprises removing, especially melting and/or evaporating, a web extending between two neighboring perforations of said coupling element.

\* \* \* \* \*